UNITED STATES PATENT OFFICE.

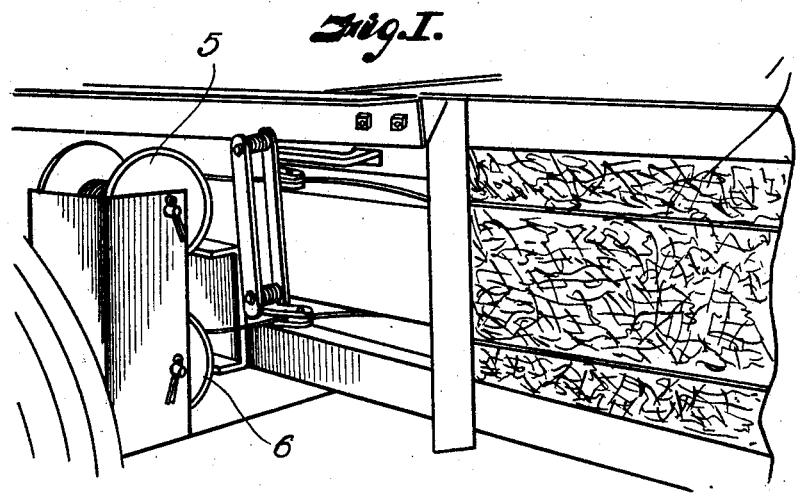
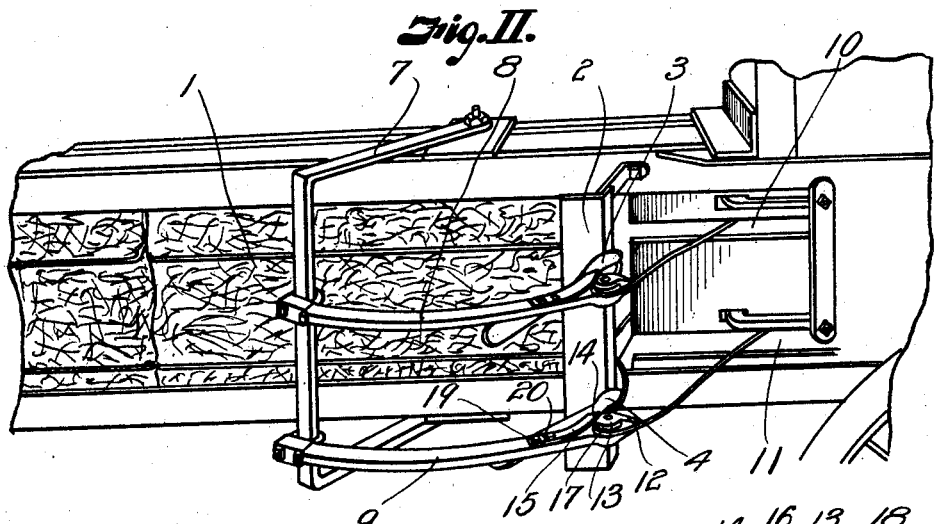
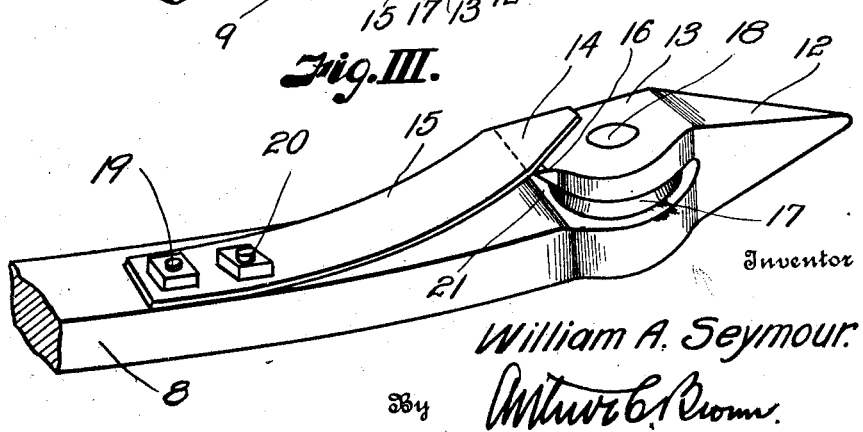

WILLIAM A. SEYMOUR, OF LEAVENWORTH, KANSAS.

BALING-WIRE NEEDLE.

1,389,386.  Specification of Letters Patent.  Patented Aug. 30, 1921.

Application filed August 30, 1920. Serial No. 406,816.

*To all whom it may concern:*

Be it known that I, WILLIAM A. SEYMOUR, a citizen of the United States, residing at Leavenworth, in the county of Leavenworth and State of Kansas, have invented certain new and useful Improvements in Baling-Wire Needles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to baling presses and particularly to a needle for threading the baler wires through the press and around the bale preparatory to tying them.

I have provided means whereby the engagement of the wire will be insured at each beat or swing of the needle and the construction is such that after the wire is guided over the hook or head, it will be maintained in engagement therewith by a guard, which will prevent its becoming accidentally detached but which will enable it to be withdrawn when the ends of the wire are tied about the bales.

Other advantages as well as the novel details of construction of the invention will appear as the nature of the device is better understood, reference being had to the accompanying drawings, in which—

Figure I is a perspective view of one side of a portion of a press, showing the wire reel or spool.

Fig. II is a side elevational view of the machine, showing the needles in wire-engaging position after they have passed through to the spool and been retracted to bring the loose ends of the wire ready for tying, and Fig. III is a detail, fragmentary, perspective view of the needle head or hooked end provided with the wire guard and guide.

The press or baling machine may consist of a baling chamber 1 into which the bales may be formed in any well known manner. On the upright 2 are shown wire clamps 3 and 4, which may grip the ends of the wires from the spools 5 and 6. The bale is then progressed through the chamber 1 with the wire formed on three sides, the spools 5 and 6 releasing enough wire for this purpose. Then the hook-shaped frame 7 is swung on an arc, projecting the needles 8 and 9 through the slots 10 and 11 respectively to cause the inclined end 12 of each needle to ride under its respective wire and cause the wire to pass over the head 13 and beneath the upwardly curved lip 14 of the guide and guard member 15 so that the wire will pass beneath the hooked portion 16 of the needle and rest against the grooved pulley 17 carried in the slotted head and mounted upon the pin 18 (see Fig. III).

The guide and guard member 15 is shown as consisting of a strip of spring steel, one end being fastened to the body of the needle by the fastening devices 19 and 20 while the free end overlaps the hooked portion 16 of the head 13 and extends above the same so as to initially serve as a guide for guiding the wire beneath the hooked portion 16 and then to prevent the release of the wire over the hook 16. After the wire has moved into the space 21 covered by the member 15, it can only be released from the hook by severing it and drawing it through said space. Therefore, when the needles are retracted, the wires will be carried through the slots 10 and 11 to the position shown in Fig. II, whereupon they may be severed and the free ends brought into contact with the ends carried by the clamps 3 and 4 and twisted together in the usual way so that the bale will be completely bound by the wire. The free ends from the spools are then again clamped in the clamps 3 and 4 and the operation is repeated.

The general operation of these devices is well understood, the essential feature in this particular case being the novel construction of the needle which consists of the bar, preferably curved with the novel construction of head and guard, as previously described.

In actual practice I have found that the guard and guide member 15 insures a uniform engagement of the wire for each operation of the needle and liability of missing is eliminated.

What I claim and desire to secure by Letters-Patent is:

1. A wire-engaging needle for baling machines comprising a swinging bar having a wire-engaging, hooked end, and a yielding guard carried by the bar, the guard having a free end overlapping the hooked end to retain the wire in engagement with the hooked end.

2. A wire-engaging needle for baling machines comprising a bar having a wire-engaging, hooked end, and a flat spring having one end fastened to the bar and the other free to press against the hooked end to constitute a guide and guard member for the wire to guide it into engagement with the hooked end and retain it in engagement therewith.

In testimony whereof I affix my signature.

WILLIAM A. SEYMOUR.